United States Patent [19]

Hendricks et al.

[11] Patent Number: 4,743,145
[45] Date of Patent: * May 10, 1988

[54] QUICK CHANGE DRILL CHUCK SYSTEMS

[75] Inventors: Daniel A. Hendricks, Bothell; Paul J. Shemeta, Seattle, both of Wash.

[73] Assignee: The Boeing Company, Seattle, Wash.

[*] Notice: The portion of the term of this patent subsequent to Feb. 17, 2004 has been disclaimed.

[21] Appl. No.: 935,370

[22] Filed: Nov. 26, 1986

[51] Int. Cl.4 .................. B23B 45/14; B23Q 11/10
[52] U.S. Cl. ........................... 408/59; 279/20; 279/1 B; 408/72 B; 408/239 R
[58] Field of Search .............. 408/56, 57, 61, 59, 408/60, 239 R, 239 A, 241 R, 115 B, 72 B, 97; 279/81, 75, 20, 1 B; 81/442; 409/134, 135, 136

[56] References Cited

U.S. PATENT DOCUMENTS 3,371,560  3/1968  Kaser ..................... 408/97
4,188,041  2/1980  Soderberg ................ 279/81
4,643,621  2/1987  Fuller, Jr.; et al. ..... 279/20

Primary Examiner—Z. R. Bilinsky
Attorney, Agent, or Firm—Conrad O. Gardner; B. A. Donahue

[57] ABSTRACT

Quick change chuck systems with integral fluid inducer. A quick change drill bushing system reduces misalignment of bushing to motor spindles and enables rapid change of cutting tools and bushing thereby reducing the number of dedicated working systems. The quick change chuck system with integral fluid inducer may utilize a quick change nosepiece system in combination.

2 Claims, 4 Drawing Sheets

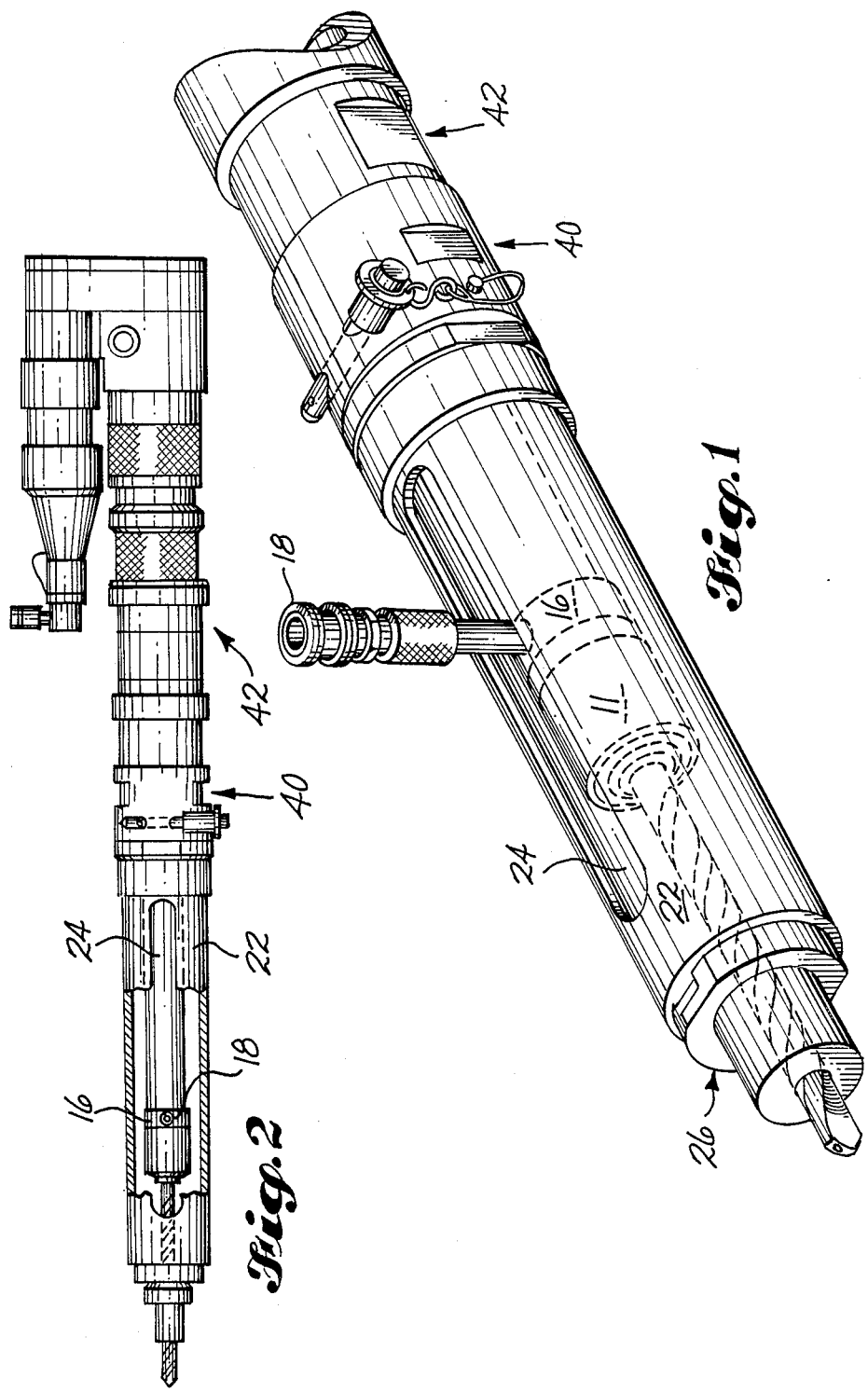

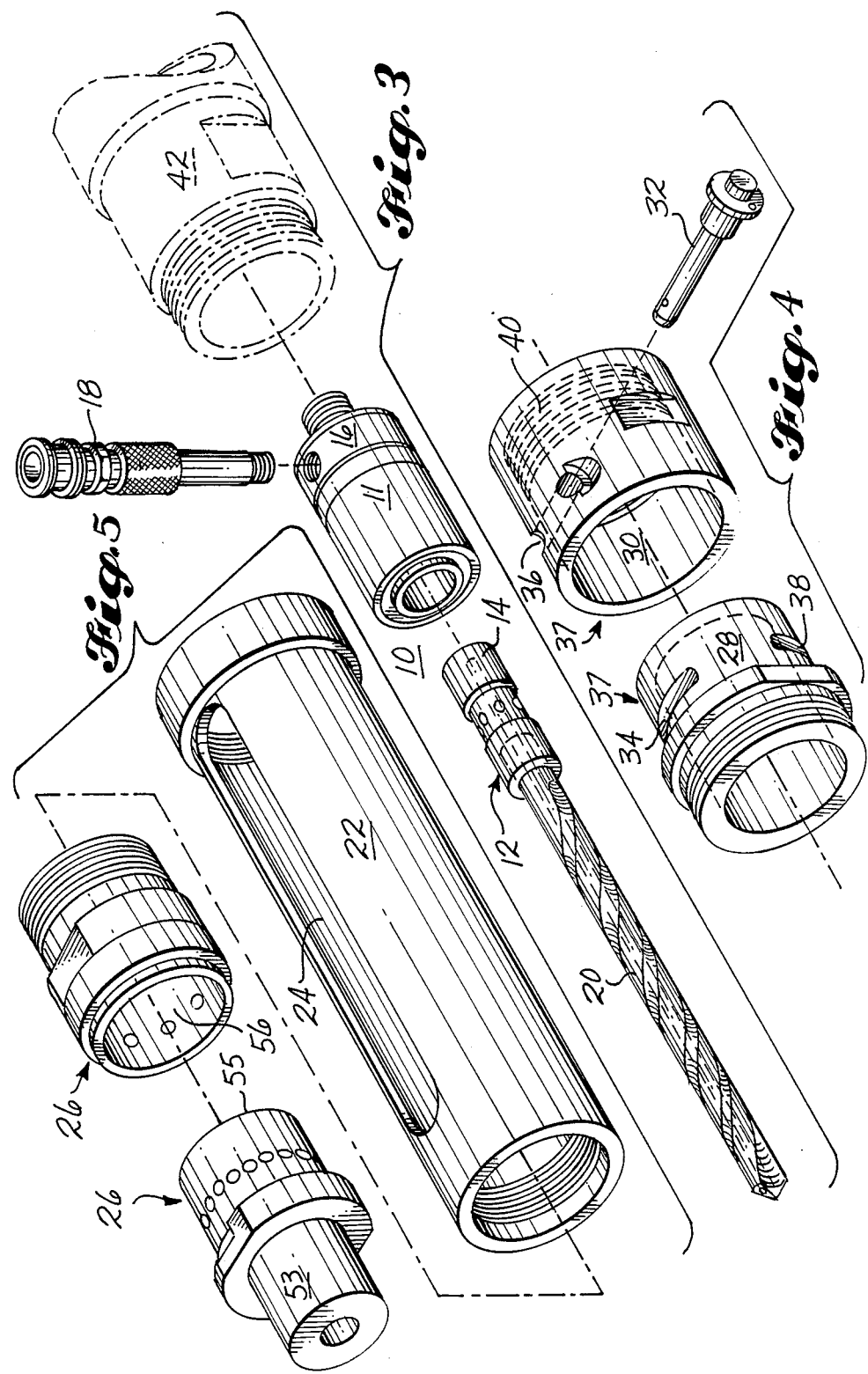

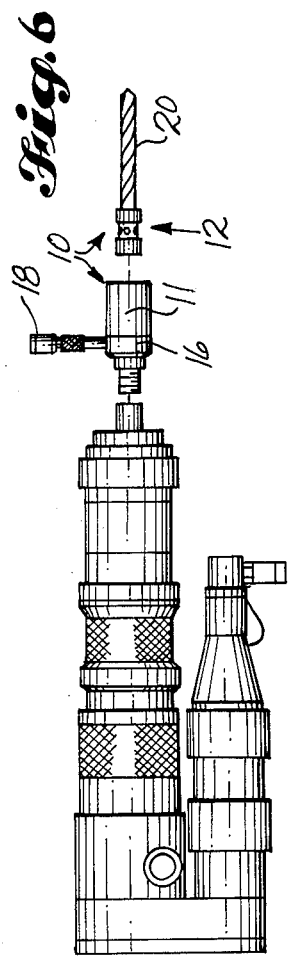
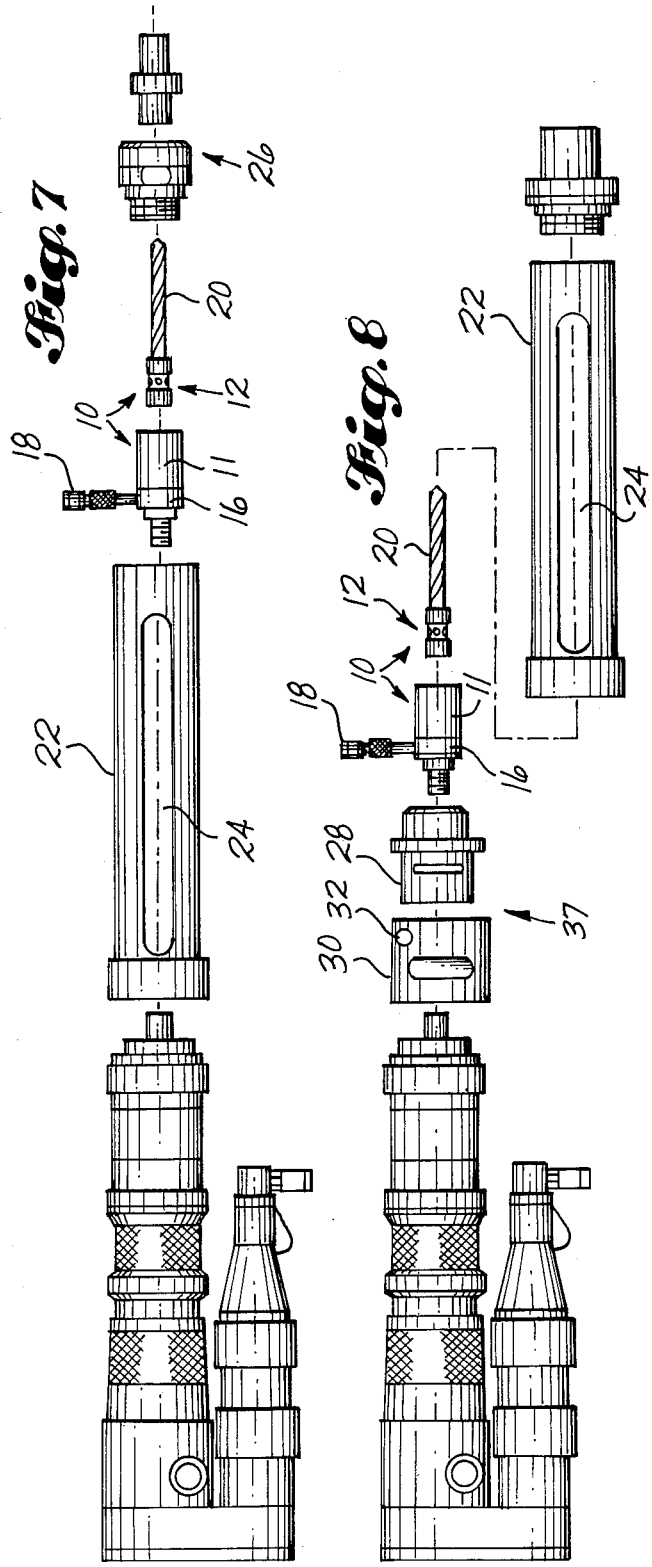

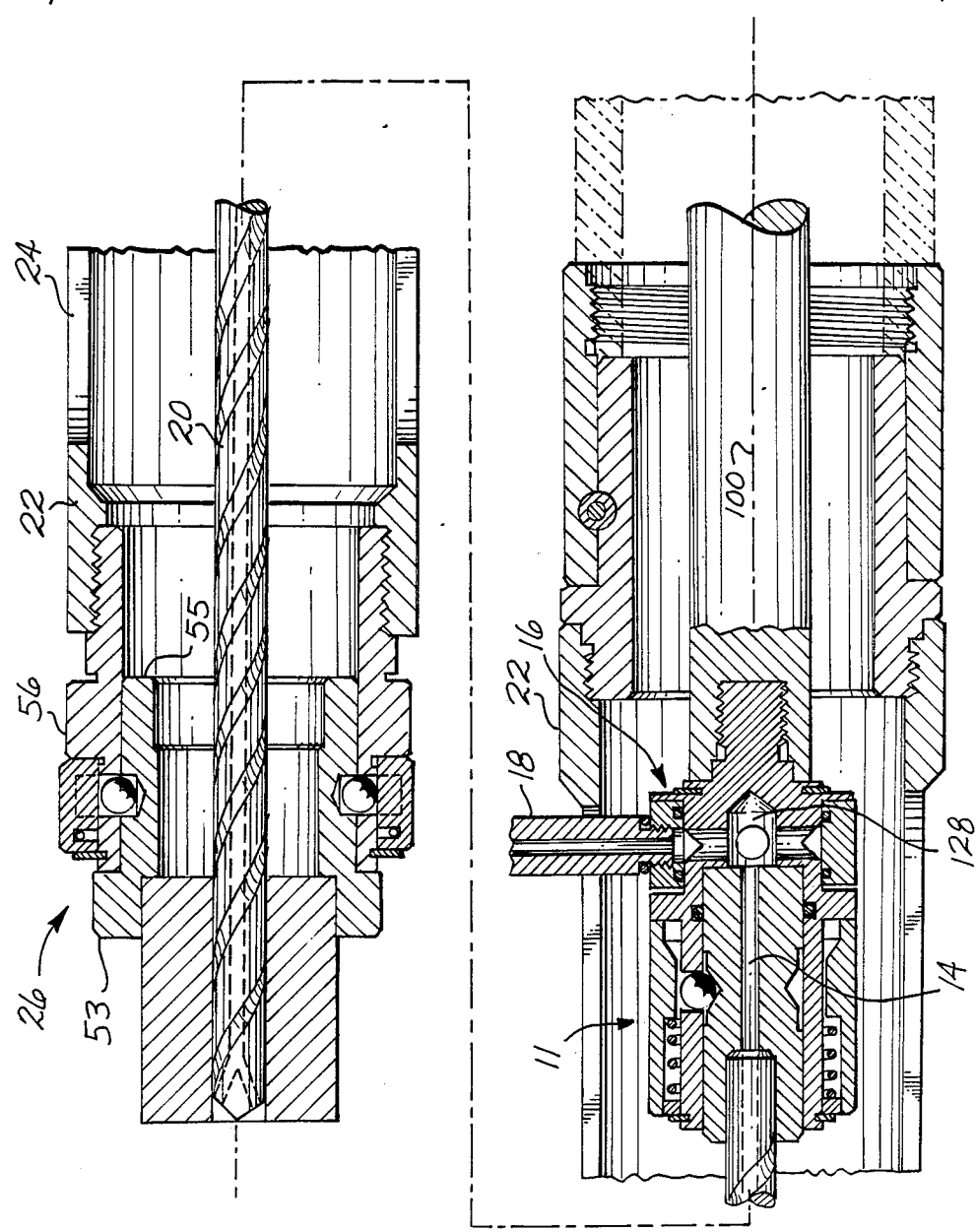

QUICK CHANGE DRILL CHUCK SYSTEMS

BACKGROUND OF THE INVENTION

The present invention relates to improvements in quick change drill chuck systems, and more particularly to fluid inducer, quick change nosepiece and quick change drill bushing systems for utilization in quick change drill chuck systems. Present quick change chuck systems such as shown in U.S. Pat. No. 4,273,344 assigned to The Boeing Company do not include the fluid inducer systems or provide for reduced misalignment of bushing to motor spindles.

Accordingly it is an object of the present invention to provide for integration of a fluid inducer in a quick change drill chuck system.

It is yet a further object of the present invention to provide for reduction of misalignment of bushing to motor spindles in quick change drill chuck systems.

Chuck construction of the type having ball detent means wherein provisions are made for fluid entry are exemplified by U.S. Pat. No. 2,733,926 whereas, exemplary prior art with respect to quick change bushing systems is shown in U.S.S.R. Pat. No. 662280, French Pat. No. 2 455 498, and U.S. Pat. Nos. 1,091,447, 1,136,987, 2,612,377, and 4,265,460.

In accordance with a preferred embodiment of the present invention a quick change chuck system includes a fluid inducer. The fluid inducer includes a fluid inducer connector and enables coupling of a coolant pump system for flow of coolant through the fluid inducer into the drill oil hole coaxially disposed in the quick change chuck adapter body. A further embodiment of quick change chuck system includes the aforementioned fluid inducer and a quick change nosepiece system which utilizes a locking pin which cooperates with a pair of opposed slots which are adapted to extend in a transverse direction relative to the axial direction of the quick change nosepiece system.

A further embodiment of quick change chuck system includes the aforementioned fluid inducer and a quick change drill bushing system.

A full understanding of the present invention and of its further objects and advantages and the several unique aspects thereof, will be had from the following description when taken in conjunction with the accompanying drawings.

BRIEF DESCRIPTION OF THE DRAWINGS

FIG. 1 is an isometric view of an embodiment of the present quick change chuck system having integral fluid inducer and further utilizing a quick change nosepiece system;

FIG. 2 is a side view of the embodiment of FIG. 1 with partial section to show the quick change chuck system having integral fluid inducer;

FIG. 3 is an expanded isometric view of the quick change chuck system with integral fluid inducer utilized in the embodiment of FIGS. 1 and 2;

FIG. 4 is an expanded isometric view of the quick change nosepiece system utilized in the embodiment of FIGS. 1 and 2;

FIG. 5 is a quick change drill bushing system which may be utilized in combination with the quick change chuck having integral fluid inducer of FIG. 3;

FIG. 6 shows in side view a first working system embodiment of the present quick change chuck having integral fluid inducer;

FIG. 7 shows in side view a second working system embodiment of the present quick change chuck having integral fluid inducer with quick change drill bushing utilizing component hardward of FIGS. 3 and 5;

FIG. 8 shows in side view a third working system embodiment of the present quick change chuck having integral fluid inducer with quick change nosepiece system utilizing component hardware of FIGS. 3 and 4 and also shown in the isometric view of FIG. 1; and, FIG. 9 is a longitudinal sectional view of system hardware components which are used in the three working system embodiments of FIGS. 6, 7, and 8.

DESCRIPTION OF THE PREFERRED EMBODIMENTS

The isometric view shown in FIG. 1 and side view of FIG. 2 are included for quick reference and introduction to the present quick change drill chuck system showing the quick change chuck 11 coupled for fluid flow from integrally disposed fluid inducer 16 by means of fluid inducer connector 18. Fluid inducer connector 18 is shown protruding through slot 24 in nose piece member 22. Drill bushing assembly 26 is seen coupled to nose piece 22, while quick change nosepiece system 40 is seen coupled between nose piece member 22 and nose housing 42 of the motor.

Turning now to FIGS. 4 and 5 a quick change drill chuck system 10 includes a chuck portion 11 and adapter portion 12 which adapter portion 12 has circumferential ball detents. Quick change chuck 10 comprising chuck portion 11 and adapter portion 12 the details of which are adopted herein by reference, are shown in U.S. Pat. No. 4,273,344 also assigned to The Boeing Company. The adapter portion 12 is modified however to include an oil hole 14 so that when fluid inducer 16 is provided as an integral part of chuck 11, cooling fluids flowing through fluid inducer connector 18 are transmitted down through coaxial passage 14 in adapter 12 thereby cooling drill member 20.

Nose piece 22 includes a longitudinal slot 24 which in the later figures will be shown to provide a passage for fluid inducer connector 18 external to nose piece member 22. Quick change drill bushing system 26 includes quick change drill bushing 53 which has an end portion 55 that inserts into quick change drill bushing adapter 56. Quick change drill bushing system 26 including bushing 53 and adapter 56 are coaxially disposed about the quick change drill chuck system central axis. A quick change nosepiece system 37 comprising a pair of coaxially disposed tubular shaped inner and outer members 28 and 30 respectively which utilize a locking pin 32 cooperating with by insertion through a pair of opposed slots 34 and 36 which opposed slots 34 and 36 in inner and outer members 28 and 30 are adapted to extend in a transverse direction relative to the axial direction of quick change nosepiece system 37. Actually there are three slots equiangularly disposed around the outer surface of tubular shaped inner member 28 (a second shown at 38 and the third hidden from view). Threaded connection 40 provides coupling between quick change nosepiece system member 30 and the nose housing 42 of the motor.

Turning now to FIG. 9, three-piece quick change drill bushing system 26 (discussed with reference to FIG. 5) which utilizes ball detent coupling is seen surrounding drill member 20, quick change drill bushing system 26 being coupled by threads into nose piece member 22. Nose piece member 22 includes slot 24 which can be seen in the lower portion of FIG. 9 to permit passage of fluid inducer connector 18 through nose piece member 22 for coupling to an external cooling fluid source (not shown). Quick change chuck assembly 11 includes the aforementioned adapter 12 for drill 20 as was previously mentioned as shown in U.S. Pat. No. 4,273,344. As previously mentioned in connection with the description of FIGS. 3, 4, and 5, a modified adapter 12 includes the fluid passage 14 coaxially disposed about the center axis 100 of the present quick change drill chuck system.

Integrally disposed fluid inducer system 16 shown generally at 16 permits the passage of coolant through fluid inducer connector 18 into chamber 128 coaxially disposed within inducer body member 30 thereby permitting fluid flowing through fluid inducer connector 18 to pass through central passage 14 within adapter 12 and into a hole 40 coaxially disposed and extending along the length of drill member 20 exiting drill member 20 as can be seen in FIG. 1 through end aperture means 42 which include oil holes (only one being shown) on opposite faces of the drill point. Proceeding from quick change chuck 11 and fluid inducer system 16 in integral assembly therewith, in the direction of the nose housing 42 of the motor (as seen in FIG. 3), coaxial cylindrically shaped inner and outer members 28 and 30 comprising the quick change nosepiece system are seen. Locking pin 32 as described in more detail earlier in connection with the description of FIG. 4 is seen disposed in locked position for securing together coaxially disposed cylindrically shaped inner and outer members 28 and 30.

FIG. 6 shows a first working system embodiment of the present quick change chuck 10 with integral fluid inducer 16 without further hardware as shown in the second and third working system embodiments of FIGS. 7 and 8.

FIG. 7 shows a second working system embodiment of the present quick change chuck 10 with integral fluid inducer 16. A quick change drill bushing system 26 in combination therewith is also utilized as hereinbefore described in reference to FIG. 5.

FIG. 8 shows a third working system embodiment of the present quick change chuck 10 having integral fluid inducer 16. A quick change nosepiece system 37 as hereinbefore described and shown in FIG. 4 is used in combination therewith.

What is claimed is:

1. In combination:
   a quick change drill chuck including a chuck portion and an adapter portion, said quick change drill chuck adapted for positioning ball elements within dimples circumferentially disposed about the central axis of said adapter portion of a tool;
   a fluid inducer system having an inducer body member and a fluid inducer connector extending in a radial direction with respect to said central axis of said adapter portion of a tool;
   said adapter portion of a tool having an oil hole coaxially disposed about said central axis of said adapter portion;
   said inducer body portion having a chamber coaxially disposed within said inducer body portion, said chamber coupled between said fluid inducer connector and said oil hole thereby permitting fluid flow therebetween; and,
   a tubular shaped nosepiece member circumferentially disposed about said central axis of said adapter portion of a tool, said tubular shaped nosepiece member including a slot thereby permitting extension of said fluid inducer connector therethrough.

2. The combination according to claim 1 further including a quick change drill bushing system having a quick change drill bushing member, said drill bushing member having an end portion inserted into a quick change drill bushing adapter member, said quick change drill bushing member and said quick change drill bushing adapter member coaxially disposed about the central axis of said tubular shaped nosepiece member.

* * * * *